United States Patent [19]

Lawson

[11] 4,234,760

[45] Nov. 18, 1980

[54] COVERING FOR T-TAP TERMINALS

[75] Inventor: Gustaf R. Lawson, Willingboro, N.J.

[73] Assignee: AMP Incorporated, Harrisburg, Pa.

[21] Appl. No.: 970,508

[22] Filed: Dec. 18, 1978

[51] Int. Cl.³ .......... H02G 15/113

[52] U.S. Cl. .......... 174/138 F; 174/71 R; 174/92

[58] Field of Search .......... 174/71 R, 92, 138 F; 339/36, 107, 114, 115 R, 115 C, 116 R, 116 C, 198 J, 208

[56] References Cited

U.S. PATENT DOCUMENTS

| | | | |
|---|---|---|---|
| 1,238,885 | 9/1917 | Chmela | 174/92 |
| 3,223,776 | 12/1965 | Piasecki | 174/92 X |
| 3,325,591 | 6/1967 | Wahl | 174/138 F |
| 3,484,541 | 12/1969 | Campbell | 174/138 F |
| 3,711,633 | 1/1973 | Ghirardi | 174/92 X |

FOREIGN PATENT DOCUMENTS

| | | | |
|---|---|---|---|
| 1224522 | 2/1960 | France | 174/92 |
| 2355387 | 1/1978 | France | 174/92 |

*Primary Examiner*—Laramie E. Askin

*Attorney, Agent, or Firm*—Allan B. Osborne

[57] ABSTRACT

The present invention relates to a covering for three way terminals known commonly as "T-Taps". More particularly, the covering comprises two halves joined by an integral hinge and having cooperating locking means.

1 Claim, 2 Drawing Figures

COVERING FOR T-TAP TERMINALS

BACKGROUND OF THE INVENTION

1. Field of the Invention

This invention relates to coverings or housings for electrical connecting devices and more particularly to a special type known as 3-way or T-tap terminal.

2. Prior Art

Prior art coverings specifically for the T-tap terminal are unknown to applicant. Coverings for other types of terminals include those disclosed in U.S. Pat. Nos. 3,332,053, 3,905,475 and Pat. No. De. 238,878. As with the present invention, these coverings had been designed for a specific type of terminal.

SUMMARY OF THE INVENTION

The present invention is a covering consisting of two halves, each being a mirror image of the other except for the locking elements. The locking elements, located in corners provided by the T-shaped halves, cooperate to firmly lock the two halves together. Each half has a cavity which may be filled with a water repellant grease to environmentally seal the T-tap terminal in the covering.

DESCRIPTION OF THE INVENTION

Figure 1:
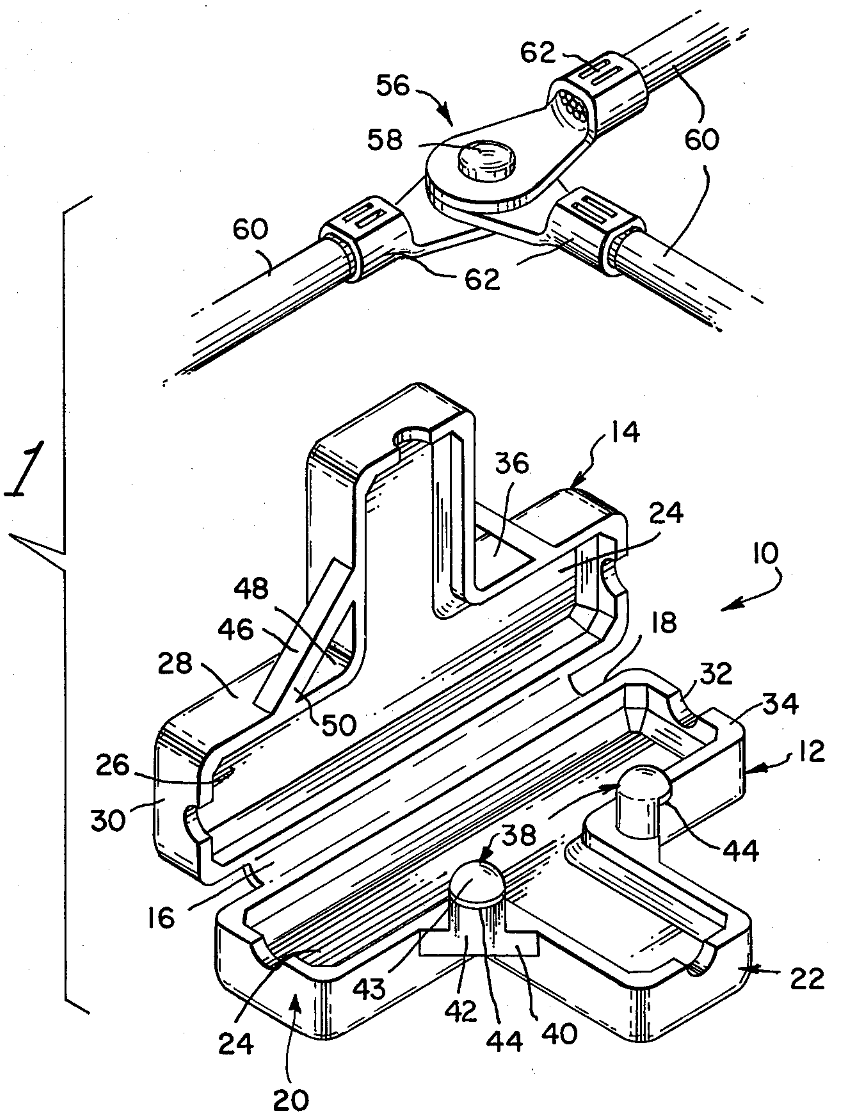
FIG. 1 is a perspective view of the covering of the present invention in an open condition preparatory to accepting the T-tap terminal shown above.

The covering, indicated generally by reference numeral 10, is molded with the preferred material being polypropylene. It consists of a lower or first half 12, an upper or second half 14 and a hinge 16 attached to the back sides 18 of both halves.

The halves are T shaped with each having a long section 20 and, perpendicular thereto, a short section 22. An open cavity 24, common to both sections, is defined by the base walls 26 of the halves, sidewalls 28 and end walls 30. An arcuate notch 32 is located in each end wall. The side and end wall thicknesses provide a discernible mating surface 34.

The locking means for the covering are located in corners 36 defined by the junction of the short and long sections. These corners are preferably rounded.

The element of the locking means on first half 12 is a pair of posts 38. These posts extend upwardly from a support ledge 40 located in the two corners. The upper surface of the ledge is flush with mating surface 34. Each post is cylindrical except for the outwardly facing side which is flat across as indicated by reference numeral 42. Vertically, the flat surface extends from the ledge towards but terminates short of the free end 43 of the post, thusly providing a downwardly facing shoulder 44. The free end itself culminates preferably in a gentle point or, as shown, is rounded.

The circumference of the post is preferably the same as that for the rounded corners so that the one bears conformably against the other.

The element of the locking means on second half 14 consists of bars 46 which extend diagonally between the short and long sections to define, in cooperation with corners 36, openings 48. The lower surface 50 of each bar is flush with mating surfaces 34.

The distance from the inside surface of the bar to the corner, as measured along a line perpendicular to the bar, is slightly less than the diameter of post 38 as measured immediately above shoulder 44. The height of the bar; i.e., the distance from lower surface 50 to upper surface 52 (FIG. 2) is equal to the length of the post from ledge 40 to shoulder 44.

Figure 2:
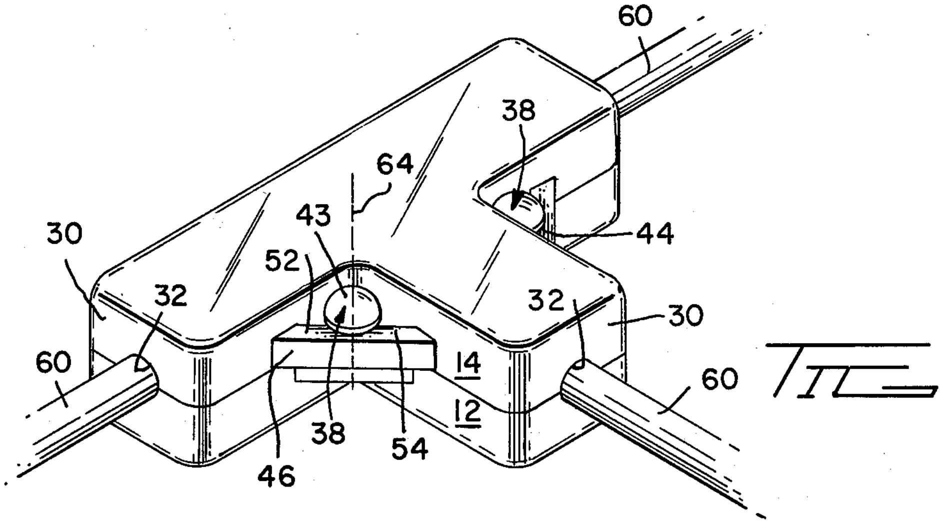
FIG. 2 shows the covering of FIG. 1 in a closed condition.

With continued reference to FIG. 2, the edge of upper surface 52 facing corner 36 is beveled as indicated by the dashed lines and reference numeral 54.

The T-tap or three-way terminal with which covering 10 is used, is shown in FIG. 1 and is generally indicated by reference numeral 56. This terminal consists of three ring tongue terminals secured together by rivet 58. Wires 60 are secured to wire barrels 62 by conventional crimping techniques. T-tap terminals are well-known having been used for a number of years and do not form a part of the present invention.

In assembly, terminal 56 is placed in cavity 24 in one of the two halves. If an environmentally tight assembly is desired, the cavities may be filled with a suitable waterproof grease (not shown). With wires 60 lying in notches 32, the two halves are brought together with posts 38 entering openings 48. Since the free ends of the posts are larger than the openings, both the walls defining corners 36 on half 14 and the bars are stretched. As shoulders 44 ride past beveled edge 54 and onto upper surface 52, the bars and corner walls spring back to the original sizes securely captivating the posts between them. The flat sides of the posts abut the inside surfaces of the bars and the rounded portions bear conformably in the corners. The posts cannot withdraw from the openings because of shoulder 44 being lodged on upper surface 52. FIG. 2 shows the completed assembly with wires 60 passing through end walls 30. The flat mating surfaces 34 on both halves provide a relatively good seal without the use of adhesives.

Of the several novel features of the present invention, one which merits special note is the integrity of the locking means. Subsequent to closing and locking the two halves, the hinge may be severed and the covering will remain securely locked and tightly closed. Further, the locked covering may be cut along the axis of short section 22 (with or without hinge 16 secured) and each part will remain tightly locked. Still another test of the integrity of the locking means is demonstrated by cutting a closed and locked covering along dashed line 64 (FIG. 2). Provided a thin blade is used, the halves of both segments will remain locked.

The foregoing detailed description has been given for clearness of understanding only, and no unnecessary limitations should be understood therefrom, as some modifications will be obvious to those skilled in the art.

What I claim is:

1. A covering for T-tap terminals or the like, comprising:

a. first and second T-shaped halves molded from resilient insulative material and each half being of generally the same structural form with the T-shape being provided by a short section perpendicularly joining a long section intermediate its end, further, each half having a cavity with openings thereto at the ends of the long section, and at the free end of the short section;

b. a hinge attached to both halves with the cavities facing each other; and c. locking means, located in each of the exterior corners formed by and at the junction of the short and long section, for locking the two halves together, said locking means including posts on one half and bars on the other half, said posts having a downwardly facing shoulder located below a free end and on an outwardly facing side of the post, said free end cylindrical at least adjacent the downwardly facing shoulder, said bars being spaced from and extending diagonally across the corners with the space therebetween being less than the diameter of the cylindrical portion of the free end of the posts so that as the two halves are brought together and the free ends of the posts are forced into the spaces, the bars and the walls defining the corners stretch so that the free ends may pass therethrough, said bars and walls recovering below the downwardly facing shoulders.

* * * * *